United States Patent
Ridgill, II et al.

(10) Patent No.: US 11,200,305 B2
(45) Date of Patent: Dec. 14, 2021

(54) VARIABLE ACCESS BASED ON FACIAL EXPRESSION CONFIGURATION

(71) Applicant: INTERNATIONAL BUSINESS MACHINES CORPORATION, Armonk, NY (US)

(72) Inventors: Stephen Paul Ridgill, II, Raleigh, NC (US); Randy A. Rendahl, Raleigh, NC (US); Ashley Kristin Silva, Durham, NC (US); Jana H. Jenkins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 16/428,206

(22) Filed: May 31, 2019

(65) Prior Publication Data

US 2020/0380099 A1    Dec. 3, 2020

(51) Int. Cl.
| | |
|---|---|
| *G06F 21/00* | (2013.01) |
| *H04L 29/06* | (2006.01) |
| *G06F 21/32* | (2013.01) |
| *G06K 9/00* | (2006.01) |

(52) U.S. Cl.
CPC ......... *G06F 21/32* (2013.01); *G06K 9/00288* (2013.01); *G06K 9/00302* (2013.01); *G06F 2221/2145* (2013.01)

(58) Field of Classification Search
CPC ............ G06F 21/32; G06F 2221/2145; G06K 9/00302; G06K 9/00288
See application file for complete search history.

(56) References Cited

U.S. PATENT DOCUMENTS

| | | | |
|---|---|---|---|
| 7,552,467 B2 | 6/2009 | Lindsay | |
| 9,082,235 B2 | 7/2015 | Lau et al. | |
| 2010/0097324 A1 | 4/2010 | Anson et al. | |
| 2012/0253953 A1* | 10/2012 | Aziz | G06Q 20/20 705/16 |
| 2013/0004016 A1* | 1/2013 | Karakotsios | G06K 9/00288 382/103 |

(Continued)

OTHER PUBLICATIONS

U.S. Appl. No. 62/797,406 corresponding to US US 2020/0238952 to Lindsay et al. Provisional filed Jan. 28, 2019, pp. 1-34.*

(Continued)

*Primary Examiner* — Lisa C Lewis
(74) *Attorney, Agent, or Firm* — Rakesh Roy

(57) ABSTRACT

A computer-implemented method for controlling access to a computing device based on one or more facial expression configurations of a user. The method captures the one or more facial expression configurations of the user, and matches the captured one or more facial expression configurations of the user with one or more defined facial expression configurations, wherein the one or more defined facial expression configurations are associated with one or more access permissions, or actions to be performed by the computing device. The method further grants the one or more access permissions to the user based on the match, and/or performs the action associated with the match. In additional embodiments, the method may further create one or more user profiles of the user, wherein each of the one or more user profiles is configured to include one or more access permissions.

14 Claims, 5 Drawing Sheets

(56) References Cited

U.S. PATENT DOCUMENTS

| | | | | |
|---|---|---|---|---|
| 2013/0155255 A1* | 6/2013 | Yu | ............... | H04N 5/23203 348/164 |
| 2013/0159939 A1* | 6/2013 | Krishnamurthi | ........ | G06F 3/011 715/863 |
| 2013/0300891 A1* | 11/2013 | Bacivarov | .......... | G06K 9/00302 348/222.1 |
| 2014/0078318 A1* | 3/2014 | Alameh | ................ | G06F 3/017 348/207.99 |
| 2014/0085460 A1* | 3/2014 | Park | ................ | G09G 3/001 348/135 |
| 2014/0118257 A1* | 5/2014 | Baldwin | ................ | G06F 3/017 345/158 |
| 2014/0126782 A1* | 5/2014 | Takai | ................ | G06F 3/04842 382/116 |
| 2015/0154394 A1* | 6/2015 | Kapinos | ................ | G06F 21/31 726/19 |
| 2015/0169066 A1* | 6/2015 | Plagemann | ............ | G06F 3/011 715/753 |
| 2016/0195923 A1* | 7/2016 | Nauseef | ............... | G06T 19/003 348/121 |
| 2017/0090582 A1* | 3/2017 | Ganesan | ............... | H04W 4/021 |
| 2018/0107816 A1* | 4/2018 | Wu | ................ | H04L 63/0861 |
| 2019/0012186 A1* | 1/2019 | Zaitsev | ............... | G06F 3/04883 |
| 2020/0028810 A1* | 1/2020 | Werner | .............. | G06K 9/00302 |
| 2020/0143186 A1* | 5/2020 | Kato | ........................ | G06F 21/32 |
| 2020/0225747 A1* | 7/2020 | Bar-Zeev | ............. | G06F 3/0484 |
| 2020/0238952 A1* | 7/2020 | Lindsay | ................ | B60R 25/25 |

OTHER PUBLICATIONS

Dwyer, "Face-Controlled Apps are here—and they are about to transform how we interact with our devices," Medium, Dec. 17, 2017, p. 1-5, https://medium.com/@braddwyer/face-controlled-apps-are-here-b1c6eb4a3e27, Accessed on May 29, 2019.

Mell et al., "The NIST Definition of Cloud Computing," National Institute of Standards and Technology, Sep. 2011, p. 1-3, Special Publication 800-145.

Singh, "The 10 Best Face Recognition Apps for Android and iOS," freeCodeCamp, Jan. 22, 2017, p. 1-5, https://www.freecodecamp.org/news/10-best-face-recognition-apps-for-android-and-ios-652239d64203/, Accessed on May 29, 2019.

* cited by examiner

VARIABLE ACCESS BASED ON FACIAL EXPRESSION CONFIGURATION

BACKGROUND

The present disclosure relates generally to the field of cognitive computing and more particularly to data processing and controlling access to a computing device based on identified facial expression configurations.

More than ever before, our lives are tightly intertwined and defined by our electronic footprint. Everything from our financial data to our social media presence is readily accessible and subject to impact electronically. In many instances, all of this sensitive information may be accessed from a single touchpoint on personal mobile devices.

In various instances, a mobile phone user will set up access to all of these accounts with locally stored credentials, trusting the device and its authentication mechanism to protect that access. Although this strategy may generally be okay, the device may be subject to vulnerability in unplanned instances. For example, an owner may unexpectedly be coerced to unlock the device by someone looking to steal personal data, or the owner may lend their phone to someone (e.g., a friend or child) and risk inadvertent access that can create problems in financial or social media accounts.

BRIEF SUMMARY

Embodiments of the present disclosure disclose a method, a computer program product, and a system.

A method, according to an embodiment of the disclosure, in a data processing system including a processor and a memory, for controlling access to a computing device based on one or more facial expression configurations of a user. The method includes capturing the one or more facial expression configurations of the user. The method further includes matching the captured one or more facial expression configurations of the user with one or more defined facial expression configurations, wherein the one or more defined facial expression configurations are associated with one or more access permissions. The method further includes granting the one or more access permissions to the user based on the match.

A computer program product, according to an embodiment of the disclosure, includes a non-transitory tangible storage device having program code embodied therewith. The program code is executable by a processor of a computer to perform a method. The method includes capturing the one or more facial expression configurations of the user. The method further includes matching the captured one or more facial expression configurations of the user with one or more defined facial expression configurations, wherein the one or more defined facial expression configurations are associated with one or more access permissions. The method further includes granting the one or more access permissions to the user based on the match.

A computer system, according to an embodiment of the disclosure, includes one or more computer devices each having one or more processors and one or more tangible storage devices; and a program embodied on at least one of the one or more storage devices, the program having a plurality of program instructions for execution by the one or more processors. The program instructions implement a method. The method includes capturing the one or more facial expression configurations of the user. The method further includes matching the captured one or more facial expression configurations of the user with one or more defined facial expression configurations, wherein the one or more defined facial expression configurations are associated with one or more access permissions. The method further includes granting the one or more access permissions to the user based on the match.

DETAILED DESCRIPTION

The present disclosure provides an escape hatch in the authentication mechanism, on user computing devices, that protects sensitive data on the device, such as financial data or social media accounts, while at the same time providing the impression to a user that access to the device is fully granted.

Security measures may be taken to prevent access to personal computing devices. Such measures may include authentication codes, fingerprint access, facial recognition access, etc. The present disclosure takes an additional step beyond simple facial recognition and looks for specific facial expressions, or "tells", to determine a mode in which to authenticate a user. "Tells" may be configured from well known options (e.g., eyes closed, mouth open, head tilted, etc.) or may include not so well known options (e.g., sentiment or emotional state of a user).

Each profile, in exemplary embodiments, can be configured to include specific applications and specific saved credentials but would show no evidence of the other capabilities on the user computing device, which are only accessible in other configured modes. Additionally, the present disclosure discloses that activation of a user profile can include automated actions designed with the intent of that specific user profile.

Hereinafter, exemplary embodiments of the present invention will be described in detail with reference to the attached drawings.

The present disclosure is not limited to the exemplary embodiments below, but may be implemented with various modifications within the scope of the present disclosure. In addition, the drawings used herein are for purposes of illustration, and may not show actual dimensions.

Figure 1:
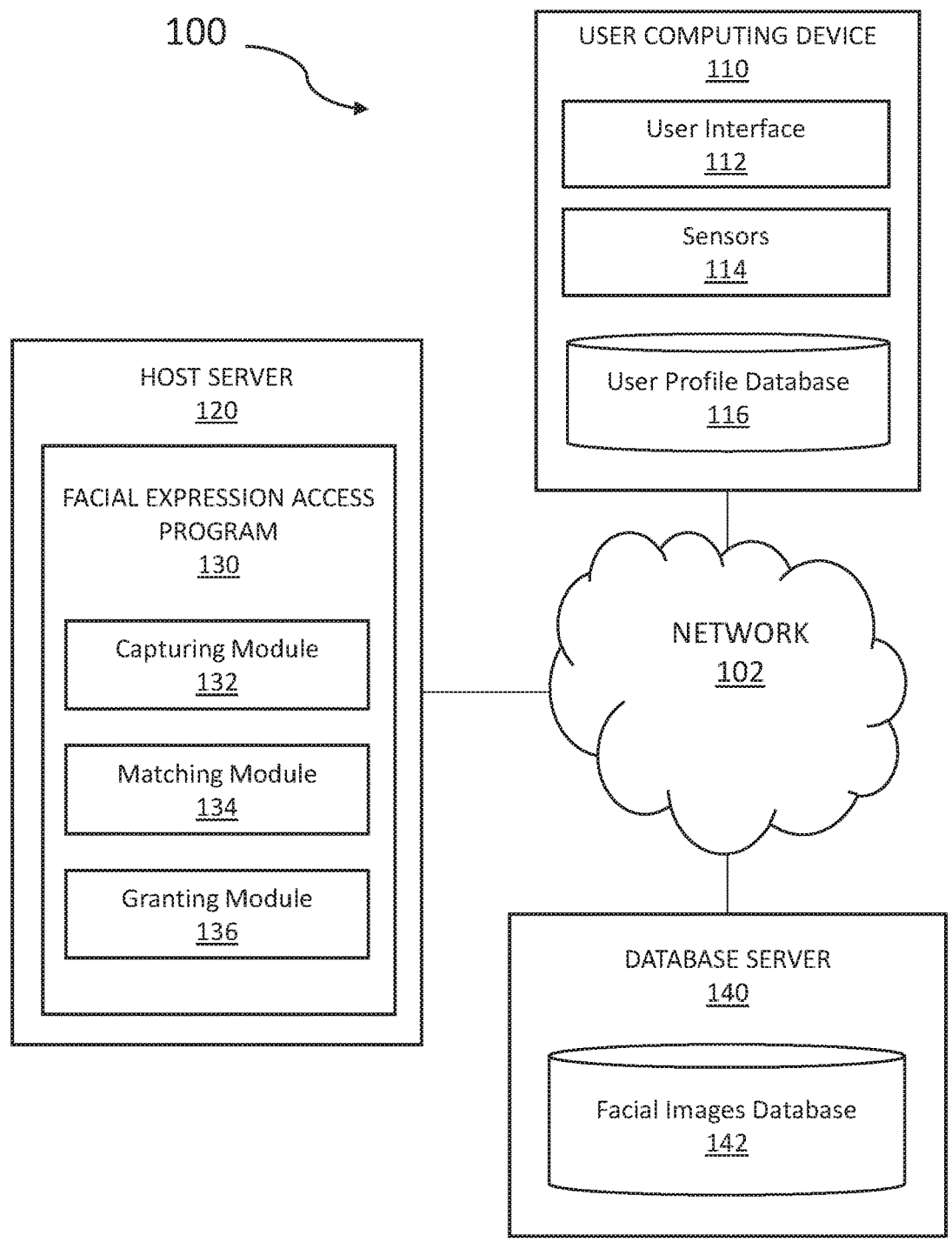
FIG. 1 illustrates a facial expression access computing environment, in accordance with an embodiment of the present disclosure.

FIG. 1 illustrates facial expression access computing environment 100, in accordance with an embodiment of the present disclosure.

Facial expression access computing environment 100 includes user computing device 110, host server 120, and database server 140, all connected via network 102. The setup in FIG. 1 represents an example embodiment configuration for the present disclosure, and is not limited to the depicted setup in order to derive benefit from the present disclosure.

In an exemplary embodiment, user computing device 110 includes user interface 112, sensors 114, and user profile database 116. In various embodiments, user computing device 110 may be a laptop computer, tablet computer, netbook computer, personal computer (PC), a desktop computer, a personal digital assistant (PDA), a smart phone, a server, a wearable device, or any programmable electronic device capable of communicating with host server 120 and database server 140, via network 102. User computing device 110 may include internal and external hardware components, as depicted and described in further detail below with reference to FIG. 3. In other embodiments, user computing device 110 may be implemented in a cloud computing environment, as described in relation to FIGS. 4 and 5, herein. User computing device 110 may also have wireless connectivity capabilities allowing it to communicate with host server 120, database server 140, and other computers or servers over network 102.

In exemplary embodiments, user computing device 110 includes user interface 112, which may be a computer program that allows a user to interact with user computing device 110 and other connected devices via network 102. For example, user interface 112 may be a graphical user interface (GUI). In addition to comprising a computer program, user interface 112 may be connectively coupled to hardware components, such as those depicted in FIG. 3, for sending and receiving data. In an exemplary embodiment, user interface 112 may be a web browser, however in other embodiments user interface 112 may be a different program capable of receiving user interaction and communicating with other devices, such as host server 120.

In exemplary embodiments, user interface 112 may be a touch screen display, a visual display, a remote operated display, or a display that receives input from a physical keyboard or touchpad. In alternative embodiments, user interface 112 may be operated via voice commands or by any other means known to one of ordinary skill in the art.

Sensors 114, in an exemplary embodiment, may be located within user computing device 110 and may be a global positioning system (GPS), software application, proximity sensor, camera, microphone, light sensor, infrared sensor, weight sensor, temperature sensor, tactile sensor, motion detector, optical character recognition (OCR) sensor, occupancy sensor, heat sensor, analog sensor (e.g., potentiometers, force-sensing resistors), radar, radio frequency sensor, video camera, digital camera, Internet of Things (IoT) sensors, lasers, gyroscopes, accelerometers, structured light systems, user tracking sensors (e.g., eye, head, hand, and body tracking positions of a user), and other devices used for measuring an environment or current state of the user and/or the physical environment of the user. In exemplary embodiments, sensors 114 can capture real time images of the user.

In exemplary embodiments, the data collected from sensors 114 may be useful in activating facial expression access program 130. For example, an accelerometer on user computing device 110 determines that user computing device 110 has been picked up, and in turn activates the camera on user computing device 110 to take a snapshot of the user's facial expression as the user attempts to unlock, or use, user computing device 110.

In alternative embodiments, sensors 114 are capable of continuously monitoring, collecting, and saving collected data of a user on a local storage database, such as user profile database 116, sending the collected data to facial expression access program 130 for analysis, or archiving the collected data on facial images database 142. In alternative embodiments, sensors 114 may be capable of detecting, communicating, pairing, or syncing with IoT devices, thus creating opportunities for more direct integration of the physical world into computer-based systems, and resulting in improved efficiency, accuracy, and economic benefit in addition to reduced human intervention.

In various embodiments, sensors 114 may be embedded within user computing device 110 and contain a computer processing unit (CPU), memory, and power resource, and may be capable of communicating with host server 120 and database server 140 over network 102.

In exemplary embodiments, user profile database 116 may be local data storage on user computing device 110 that contains one or more sets of user data that correspond to various facial expression configurations of a user. The facial configurations of the user include "tell" signs (e.g., one closed eye, puckering lips, a muted facial expression, and so forth) that direct to user computing device 110 which mode of access is being requested by the specific facial expression configuration.

For example, images of the user and/or additional users that access user computing device 110 can be set up with one or more user profiles. The one or more user profiles can include various modes of access to specific applications and/or data on user computing device 110 based on pre-configurations for a child's access, an adult's access, a guest's access, or any other configuration required based on the information that the user wants to reveal and/or keep hidden.

The various created user profiles may be stored in user profile database 116 as data objects, such as <userA, full_access>; <userB, limited_access>; and <userC, fully_restricted>. In exemplary embodiments, sensors 114 transmit the collected data for each user profile to facial expression access program 130.

While user profile database 116 is depicted as being stored on user computing device 110, in other embodiments, user profile database 116 may be stored on host server 120, facial expression access program 130, or any other device or database connected via network 102, as a separate database. In alternative embodiments, user profile database 116 may be comprised of a cluster or plurality of computing devices, working together or working separately.

With continued reference to FIG. 1, host server 120 includes facial expression access program 130. In various embodiments, host server 120 may be a laptop computer, tablet computer, netbook computer, personal computer (PC), a desktop computer, a personal digital assistant (PDA), a smart phone, a server, or any programmable electronic device capable of communicating with user computing device 110 and database server 140, via network 102. Host server 120 may include internal and external hardware components, as depicted and described in further detail below with reference to FIG. 3. In other embodiments, host server 120 may be implemented in a cloud computing environment, as described in relation to FIGS. 4 and 5, herein. Host server 120 may also have wireless connectivity capabilities allowing it to communicate with user computing device 110, database server 140, and other computers or servers over network 102.

Facial expression access program 130, in an exemplary embodiment, may be a computer application on host server 120 that contains instruction sets, executable by a processor. The instruction sets may be described using a set of functional modules. In exemplary embodiments, facial expression access program 130 can receive input from user computing device 110 and database server 140 over network 102. In alternative embodiments, facial expression access program 130 may be a computer application on user computing device 110, or a standalone program on a separate electronic device.

With continued reference to FIG. 1, the functional modules of facial expression access program 130 include capturing module 132, matching module 134, and granting module 136.

In exemplary embodiments, database server 140 includes facial images database 142. In various embodiments, database server 140 may be a laptop computer, tablet computer, netbook computer, personal computer (PC), a desktop computer, a personal digital assistant (PDA), a smart phone, a server, or any programmable electronic device capable of communicating with user computing device 110 and host server 120, via network 102. Database server 140 may include internal and external hardware components, as depicted and described in further detail below with reference to FIG. 3. In other embodiments, database server 140 may be implemented in a cloud computing environment, as described in relation to FIGS. 4 and 5, herein. Database server 140 may also have wireless connectivity capabilities allowing it to communicate with user computing device 110, host server 120, and other computers or servers over network 102.

In exemplary embodiments, facial images database 142 contains one or more sets of defined facial expression images that correspond to various facial expression configurations of a specific user. The one or more sets of defined facial expression images are matched with captured images from capturing module 132 in order to authenticate a user prior to unlocking a user computing device 110. Furthermore, the one or more sets of defined facial expression images are associated with a set of preconfigured actions to be performed on user computing device 110.

While facial images database 142 is depicted as being stored on database server 140, in other embodiments, facial images database 142 may be stored on user computing device 110, host server 120, facial expression access program 130, or any other device or database connected via network 102, as a separate database. In alternative embodiments, facial images database 142 may be comprised of a cluster or plurality of computing devices, working together or working separately.

Figure 2:
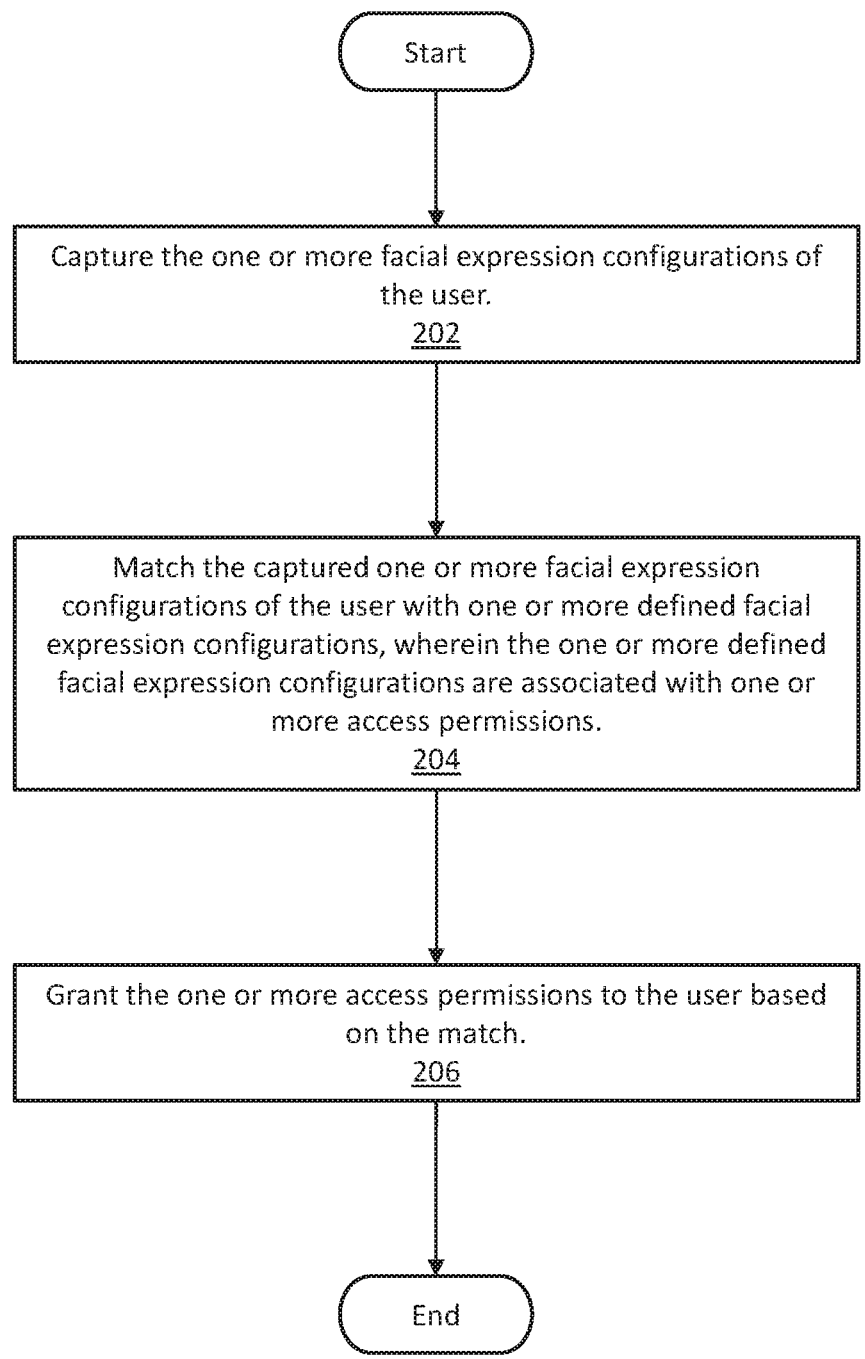
FIG. 2 is a flowchart illustrating the operation of a facial expression access program, in accordance with an embodiment of the present disclosure.

FIG. 2 is a flowchart illustrating the operation of facial expression access program 130 of FIG. 1, in accordance with embodiments of the present disclosure.

With reference to FIGS. 1 and 2, capturing module 132 includes a set of programming instructions in facial expression access program 130, to capture one or more facial expression configurations of the user (step 202). The set of programming instructions is executable by a processor.

In exemplary embodiments, a facial expression configuration may include at least one of the following: both eyes of the user are closed, both eyes of the user are open, one eye of the user is open and the other eye of the user is closed, teeth of the user are showing, teeth of the user are not showing, hand of the user in view, hand of the user not in view, eyeglasses of the user are on, eyeglasses of the user are off, mouth of the user is open, mouth of the user is closed, head of the user is tilted, and any further one or more facial expression configurations of the user including one or more ears, one or more eyes, one or more eyebrows, lips of the user, and mouth of the user. The present disclosure is not limited to the facial expression configurations mentioned above, but rather may include any facial expression configuration, together with any hand, finger, ear(s), mouth, eye(s), eyebrow(s), lip(s), cheek(s), and tongue configuration that a user is capable of making in front of the camera on user computing device 110.

In further exemplary embodiments, a facial expression configuration is not limited to still images or screenshots of a user, but can include short video clips of the user with defined facial expression configurations, or movements, such as wiggling one's ear(s), blinking one's eye(s) in a pattern (e.g., Morse code), verbal statements, sounds, and so forth.

In exemplary embodiments, capturing module 132 may be capable of obtaining one or more facial expression configurations of a user by means of a camera, video, and/or other sensors 114 on user computing device 110.

In exemplary embodiments, facial expression access program 130 may create one or more user profiles of the user, wherein each of the one or more user profiles is configured to include one or more access permissions to user computing device 110.

With reference to an illustrative example, Jay uses his smart phone to access his financial accounts and other sensitive private data. Jay's small children oftentimes use Jay's smart phone to play video games. Jay is concerned that his small children may accidentally access Jay's financial accounts and delete/change/alter the account information while they are rushing to access the game applications. To solve this problem, Jay has created various user profiles (e.g., Jay profile #1, Jay profile #2, etc.), wherein each user profile is associated with a specific facial expression configuration, and each user profile grants specific access permissions to the smart phone. As such, when Jay picks up his smart phone to unlock it, the camera on his smart phone automatically captures an image of Jay's facial expression, together with any "tell" signs in the image which would be capable of activating additional actions on the smart phone, such as hiding all sensitive financial applications and only providing access to game applications. In this example, Jay opens his phone by closing both eyes. Capturing module 132 captures this image of Jay's facial expression and sends the captured image to facial expression access program 130.

With reference to a parallel illustrative example, Jay wants to protect the sensitive data on his smart phone in the event he is being robbed, or if his smart phone falls into the hands of someone who does not have authority to access it and has malicious intent to steal Jay's private data. In this scenario, Jay wants to restrict access to the end user. The present disclosure allows Jay to pre-configure an action associated with a "duress" facial expression that is captured by his smart phone. An example of an action may be to automatically send a distress message with location information to the local police department. In this example, Jay opens his phone by closing both eyes and opening his mouth. Capturing module 132 captures this image of Jay's facial expression and sends the captured image to facial expression access program 130.

In exemplary embodiments, capturing module 132 may archive the received sets of facial expression configuration data of various users (e.g., characteristic data) via user computing device 110, in user profile database 116. User profile database 116 may be local data storage on user computing device 110 that may contain a list of users, together with their facial expression configuration history corresponding to a specific date, time, activity, and so forth.

In alternative embodiments, capturing module 132 may be capable of building a data profile for the one or more users based on the various captured one or more facial expression configurations, and dynamically updating the data profile for the one or more users. The collected data for each user in user profile database 116 may be used as a guide reference for actions to be performed by facial expression access program 130 in various scenarios, or contexts, while the user is accessing user computing device 110.

With continued reference to FIGS. 1 and 2, matching module 134 includes a set of programming instructions in facial expression access program 130, to match the captured one or more facial expression configurations of the user with one or more defined facial expression configurations, wherein the one or more defined facial expression configurations are associated with one or more access permissions (step 204). The set of programming instructions is executable by a processor.

In exemplary embodiments, matching module 134 accesses facial images database 142 for a library of defined facial expression configurations of a user to match. Methods to match a captured facial expression of a user with a database of defined facial expression configurations are well known to one of ordinary skill in the art. In the present disclosure, a set of actions to be performed by facial expression access program 130 on user computing device 110 are associated with one or more defined facial expression configurations in facial images database 142.

In exemplary embodiments, one or more pre-configured actions (or access permissions) associated with a captured facial expression of the user may be selected from at least one of the following in a group consisting of: texting a duress message with a current location pin to a selected contact, notifying an emergency service, commencing an audio recording via the computing device, commencing a video recording via the computing device, taking a photograph via the computing device, accessing a wireless fidelity (WiFi) service, turning on user preferences, and turning off user preferences. The present disclosure is not limited to the actions mentioned herein, but rather may include any additional actions associated with the capabilities of the user computing device 110, known to one of ordinary skill in the art.

In exemplary embodiments, a first facial expression configuration of the user retrieves a first user profile and a second facial expression configuration of the user retrieves a second user profile, wherein one or more pieces of data stored on the computing device (i.e., user computing device 110) are accessible using the first user profile, but not the second user profile.

In exemplary embodiments, the one or more pieces of data stored on user computing device 110 include at least one of the following in a group consisting of: one or more applications, one or more photographs, one or more videos, contact list, call history, text messages, and one or more features.

In exemplary embodiments, a limited user interface on user computing device 110 is displayed when using the second user profile. For example, the second user profile may be configured as a "guest" profile, and may be pre-configured with restricted access permissions to user computing device 110.

With continued reference to the illustrative example above, matching module 134 processes the image of Jay closing both eyes (as well as the image of Jay closing both eyes and opening his mouth in the parallel illustrative example) and accesses facial images database 142 to determine if there is a matching image, using methods known to one or ordinary skill in the art. Matching module 134 finds the matching image, which includes specified access permissions.

In exemplary embodiments, facial expression access program 130 may perform a default action set, in response to the captured one or more facial expression configurations of the user not matching any of the one or more defined facial expression configurations.

With continued reference to FIGS. 1 and 2, granting module 136 includes a set of programming instructions in facial expression access program 130 to grant the one or more access permissions to the user based on the match (step 206). The set of programming instructions is executable by a processor.

For example, facial expression access program 130 may identify the one or more facial expression configurations of the user as a duress facial expression configuration, grant one or more limited access permissions to the computing device based on the duress facial expression configuration of the user, and execute one or more pre-configured actions, in response to identifying the duress facial expression configuration of the user.

With continued reference to the illustrative example above, granting module 136 grants limited access to Jay's user computing device 110 so that his children may have access to the game applications but not to any sensitive financial data.

With reference to the parallel illustrative example above, granting module 136 grants limited access to Jay's user computing device 110 and texts a duress message with a current location pin to Jay's selected contact, an emergency service such as 911. Additionally, granting module 136 starts an audio/video recording and transmits the recording to the emergency service while Jay is being robbed.

In alternative embodiments, user computing device 110 may be expanded to other devices, such as automatic teller machines (ATMs) and the like, which may automatically contact emergency authorities in the event a "duress" facial expression is received (e.g., when a mugging is taking place).

In an exemplary embodiment, network 102 is a communication channel capable of transferring data between connected devices and may be a telecommunications network used to facilitate telephone calls between two or more parties comprising a landline network, a wireless network, a closed network, a satellite network, or any combination thereof. In another embodiment, network 102 may be the Internet, representing a worldwide collection of networks and gateways to support communications between devices connected to the Internet. In this other embodiment, network 102 may include, for example, wired, wireless, or fiber optic connections which may be implemented as an intranet network, a local area network (LAN), a wide area network (WAN), or any combination thereof. In further embodiments, network 102 may be a Bluetooth network, a WiFi network, or a combination thereof. In general, network 102 can be any combination of connections and protocols that will support communications between user computing device 110, host server 120, and database server 140.

Figure 3:
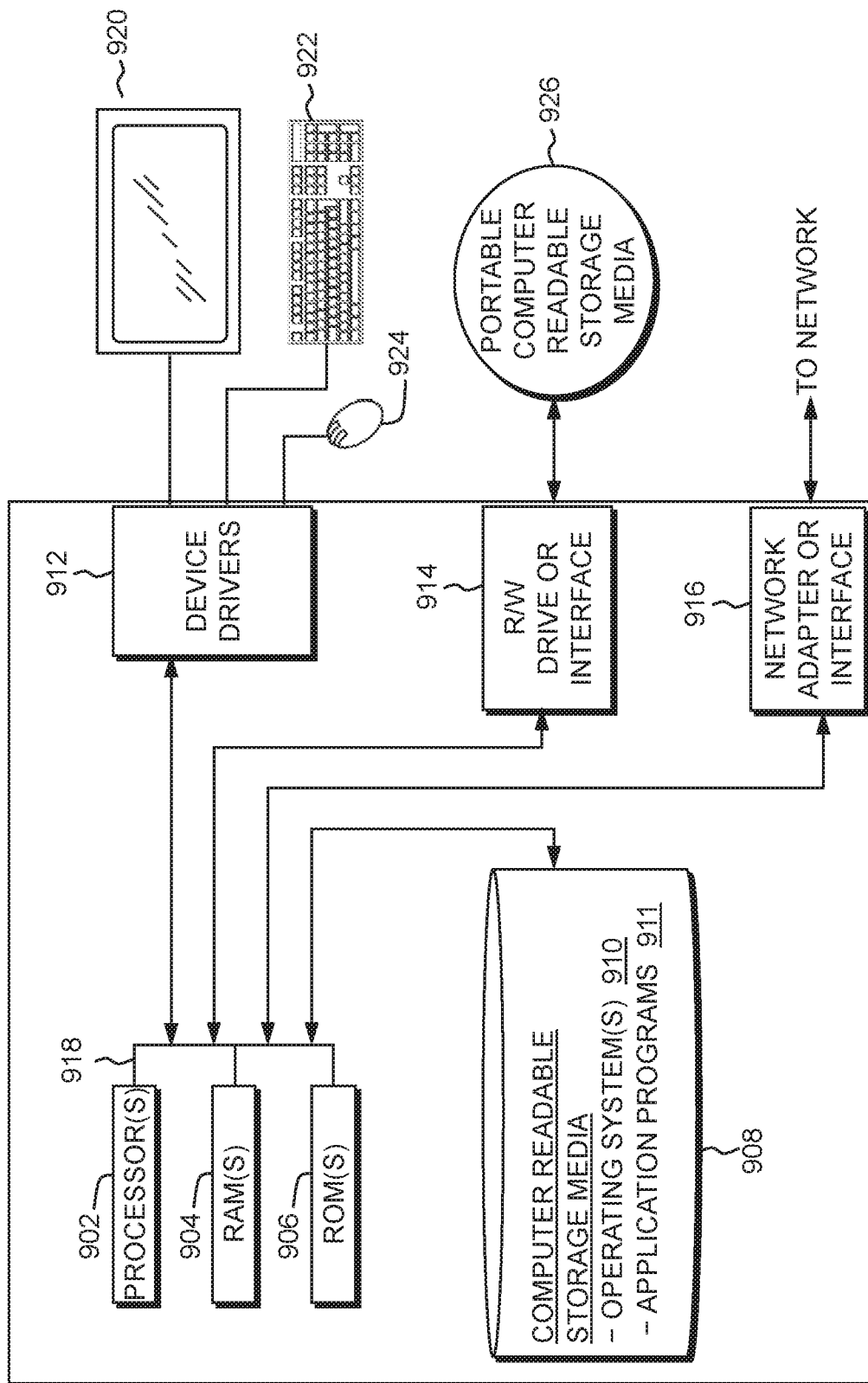
FIG. 3 is a diagram graphically illustrating the hardware components of facial expression access computing environment of FIG. 1, in accordance with an embodiment of the present disclosure.

FIG. 3 is a block diagram depicting components of a computing device (such as user computing device 110, host server 120 or database server 140, as shown in FIG. 1), in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device of FIG. 3 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as facial expression access program 130, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device of FIG. 3 may also include a R/W drive or interface 914 to read from and write to one or more portable computer readable storage media 926. Application programs 911 on host server 120 may be stored on one or more of the portable computer readable storage media 926, read via the respective R/W drive or interface 914 and loaded into the respective computer readable storage media 908.

Computing device of FIG. 3 may also include a network adapter or interface 916, such as a TCP/IP adapter card or wireless communication adapter (such as a 4G wireless communication adapter using OFDMA technology). Application programs 911 on host server 120 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device of FIG. 3 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
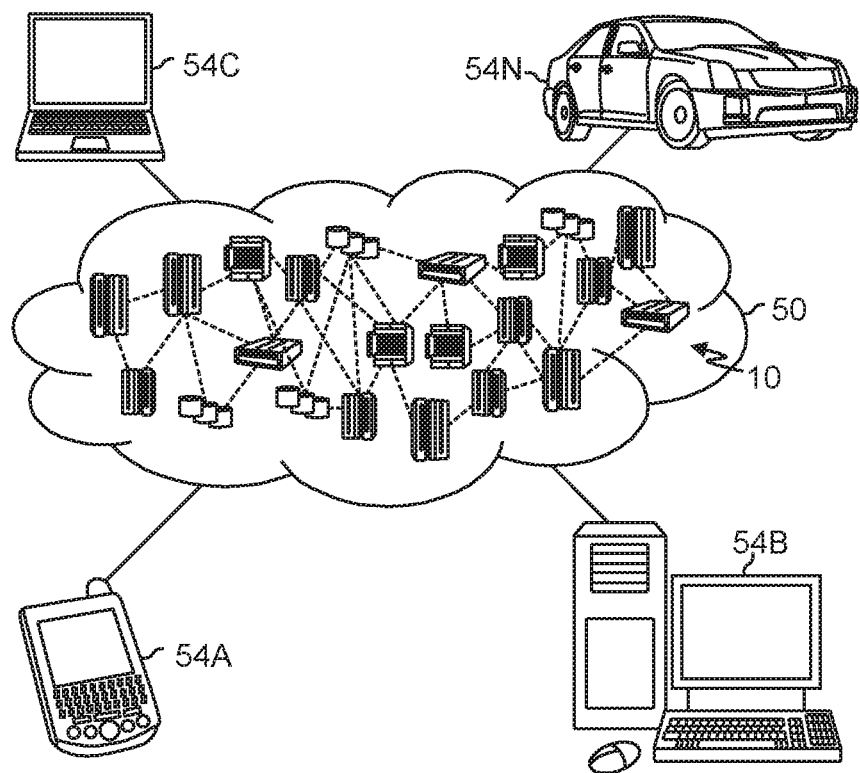
FIG. 4 depicts a cloud computing environment, in accordance with an embodiment of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
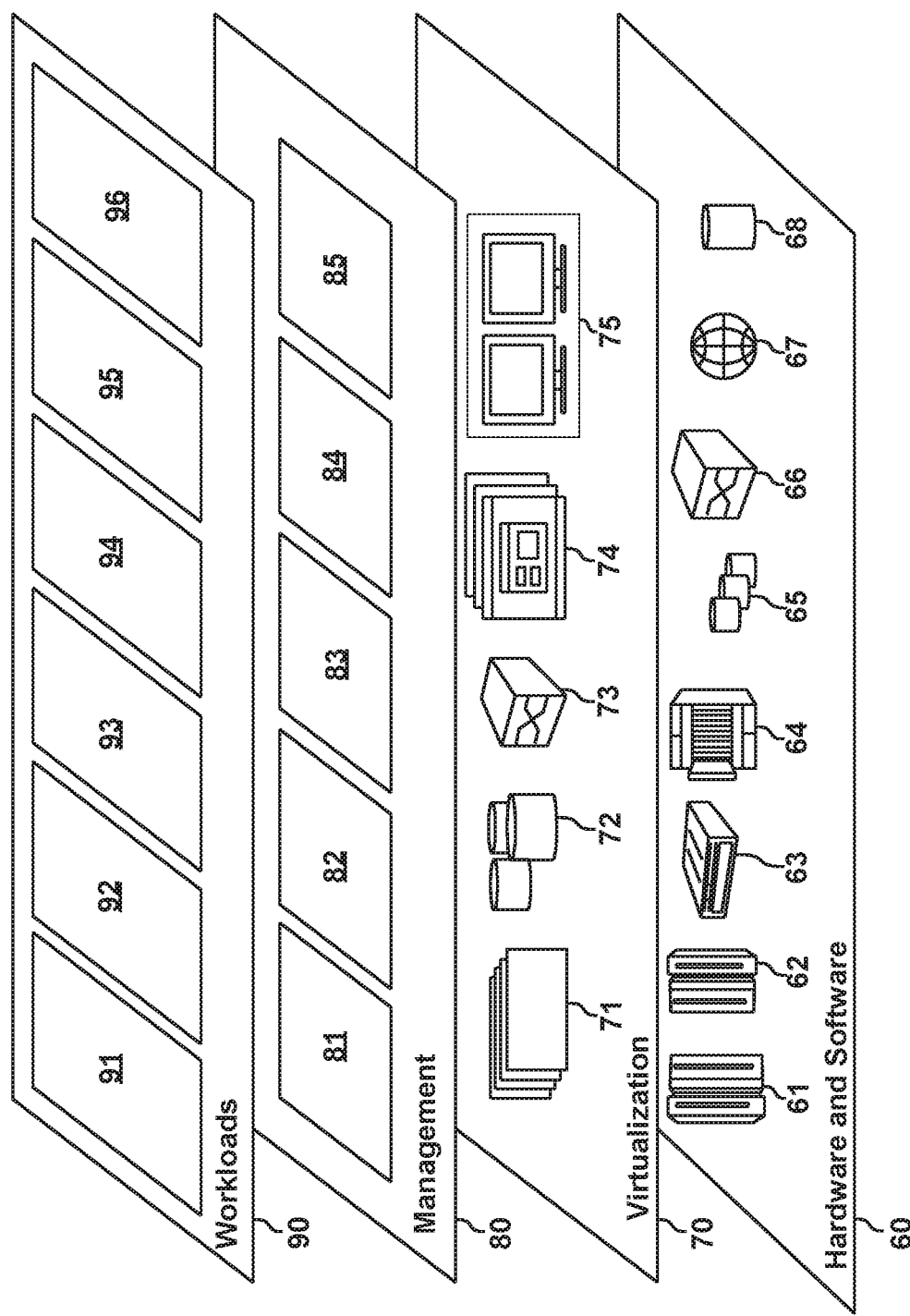
FIG. 5 depicts abstraction model layers of the illustrative cloud computing environment of FIG. 4, in accordance with an embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and controlling access to data objects 96.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present disclosure has been disclosed by way of example and not limitation.

The invention claimed is:

1. A computer-implemented method for controlling access to a computing device based on one or more facial expression configurations of a specific user, the computer-implemented method comprising:

creating one or more user profiles associated with a computing device of a specific user, wherein each of the one or more user profiles is retrieved using one or more defined facial expression configurations of the specific user, wherein the one or more user profiles of the specific user comprises a first user profile associated with providing one or more child access permissions that is retrieved using a first defined facial expression configuration of the specific user and a second user profile associated with providing one or more guest access permissions that is retrieved using a second defined facial expression configuration of the specific user, wherein one or more pieces of data stored on the computing device are not accessible using the first user profile and the second user profile;

capturing the one or more facial expression configurations of the specific user;

in response to matching the captured one or more facial expression configurations of the specific user with the first defined facial expression configuration of the specific user, retrieving the first user profile associated with providing the one or more child access permissions;

in response to matching the captured one or more facial expression configurations of the specific user with the second defined facial expression configuration of the specific user, retrieving the second user profile associated with providing the one or more guest access permissions;

granting the one or more access permissions to the specific user based on the match; and performing a default action set, in response to the captured one or more facial expression configurations of the specific user not matching any of the one or more defined facial expression configurations of the specific user.

2. The computer-implemented method of claim 1, wherein the one or more facial expression configurations of the specific user includes at least one of the following in a group consisting of: both eyes of the specific user are closed, both eyes of the specific user are open, one eye of the specific user is open and the other eye of the specific user is closed, the specific user blinking according to a pattern, teeth of the specific user are showing, teeth of the specific user are not showing, hand of the specific user in view, hand of the specific user not in view, eyeglasses of the specific user are on, eyeglasses of the specific user are off, mouth of the specific user is open, mouth of the specific user is closed, head of the specific user is tilted, and any further one or more facial expression configurations of the specific user including one or more ears, one or more eyes, one or more eyebrows, lips of the specific user, and mouth of the specific user.

3. The computer-implemented method of claim 1, further comprising:

identifying the one or more facial expression configurations of the specific user as a facial expression configuration; and executing one or more pre-configured actions, in response to identifying the facial expression configuration of the specific user.

4. The computer-implemented method of claim 3, wherein the one or more pre-configured actions are selected from at least one of the following in a group consisting of: texting a duress message with a current location pin to a selected contact, notifying an emergency service, commencing an audio recording via the computing device, commencing a video recording via the computing device, taking a photograph via the computing device, accessing a wireless fidelity (WiFi) service, turning on user preferences, and turning off user preferences.

5. The computer-implemented method of claim 1, wherein a limited user interface is displayed when using the second user profile.

6. The computer-implemented method of claim 1, wherein the one or more pieces of data stored on the computing device include at least one of the following in a group consisting of: one or more applications, one or more photographs, one or more videos, contact list, call history, text messages, and one or more features.

7. A computer program product, comprising a tangible storage device having program code embodied therewith, the program code executable by a processor of a computer to perform a method, the method comprising:

creating one or more user profiles associated with a computing device of a specific user, wherein each of the one or more user profiles is retrieved using one or more defined facial expression configurations of the specific user, wherein the one or more user profiles of the specific user comprises a first user profile associated with providing one or more child access permissions that is retrieved using a first defined facial expression configuration of the specific user and a second user profile associated with providing one or more guest access permissions that is retrieved using a second defined facial expression configuration of the specific user, wherein one or more pieces of data stored on the computing device are not accessible using the first user profile and the second user profile;

capturing the one or more facial expression configurations of the specific user;

in response to matching the captured one or more facial expression configurations of the specific user with the first defined facial expression configuration of the specific user, retrieving the first user profile associated with providing the one or more child access permissions;

in response to matching the captured one or more facial expression configurations of the specific user with the second defined facial expression configuration of the specific user, retrieving the second user profile associated with providing the one or more guest access permissions;

granting the one or more access permissions to the specific user based on the match; and performing a default action set, in response to the captured one or more facial expression configurations of the specific user not matching any of the one or more defined facial expression configurations of the specific user.

8. The computer program product of claim 7, wherein the one or more facial expression configurations of the specific user includes at least one of the following in a group consisting of: both eyes of the specific user are closed, both eyes of the specific user are open, one eye of the specific user is open and the other eye of the specific user is closed, the specific user blinking according to a pattern, teeth of the specific user are showing, teeth of the specific user are not showing, hand of the specific user in view, hand of the specific user not in view, eyeglasses of the specific user are on, eyeglasses of the specific user are off, mouth of the specific user is open, mouth of the specific user is closed, head of the specific user is tilted, and any further one or more facial expression configurations of the specific user including one or more ears, one or more eyes, one or more eyebrows, lips of the specific user, and mouth of the specific user.

9. The computer program product of claim 7, further comprising:

identifying the one or more facial expression configurations of the specific user as a facial expression configuration; and executing one or more pre-configured actions, in response to identifying the facial expression configuration of the specific user.

10. The computer program product of claim 9, wherein the one or more pre-configured actions are selected from at least one of the following in a group consisting of: texting a duress message with a current location pin to a selected contact, notifying an emergency service, commencing an audio recording via the computing device, commencing a video recording via the computing device, taking a photograph via the computing device, accessing a wireless fidelity (WiFi) service, turning on user preferences, and turning off user preferences.

11. A computer system, comprising:
one or more computer devices each having one or more processors and one or more tangible storage devices; and
a program embodied on at least one of the one or more storage devices, the program having a plurality of program instructions for execution by the one or more processors, the program instructions comprising instructions for:
creating one or more user profiles associated with a computing device of a specific user, wherein each of the one or more user profiles is retrieved using one or more defined facial expression configurations of the specific user, wherein the one or more user profiles of the specific user comprises a first user profile associated with providing one or more child access permissions that is retrieved using a first defined facial expression configuration of the specific user and a second user profile associated with providing one or more guest access permissions that is retrieved using a second defined facial expression configuration of the specific user, wherein one or more pieces of data stored on the computing device are not accessible using the first user profile and the second user profile; capturing the one or more facial expression configurations of the specific user;
in response to matching the captured one or more facial expression configurations of the specific user with the first defined facial expression configuration of the specific user, retrieving the first user profile associated with providing the one or more child access permissions;
in response to matching the captured one or more facial expression configurations of the specific user with the second defined facial expression configuration of the specific user, retrieving the second user profile associated with providing the one or more guest access permissions;
granting the one or more access permissions to the specific user based on the match; and
performing a default action set, in response to the captured one or more facial expression configurations of the specific user not matching any of the one or more defined facial expression configurations of the specific user.

12. The computer system of claim 11, wherein the one or more facial expression configurations of the specific user includes at least one of the following in a group consisting of: both eyes of the specific user are closed, both eyes of the specific user are open, one eye of the specific user is open and the other eye of the specific user is closed, the specific user blinking according to a pattern, teeth of the specific user are showing, teeth of the specific user are not showing, hand of the specific user in view, hand of the specific user not in view, eyeglasses of the specific user are on, eyeglasses of the specific user are off, mouth of the specific user is open, mouth of the specific user is closed, head of the specific user is tilted, and any further one or more facial expression configurations of the specific user including one or more ears, one or more eyes, one or more eyebrows, lips of the specific user, and mouth of the specific user.

13. The computer system of claim 11, further comprising:
identifying the one or more facial expression configurations of the specific user as a facial expression configuration; and
executing one or more pre-configured actions, in response to identifying the facial expression configuration of the specific user.

14. The computer system of claim 13, wherein the one or more pre-configured actions are selected from at least one of the following in a group consisting of: texting a duress message with a current location pin to a selected contact, notifying an emergency service, commencing an audio recording via the computing device, commencing a video recording via the computing device, taking a photograph via the computing device, accessing a wireless fidelity (WiFi) service, turning on user preferences, and turning off user preferences.

* * * * *